May 31, 1960 | E. A. QUADE | 2,939,118

STORAGE DEVICE

Filed July 3, 1956

INVENTOR.
EDWARD A. QUADE
BY John B. Clark
ATTORNEY 2,939,118

STORAGE DEVICE

Edward A. Quade, San Jose, Calif., assignor to International Business Machines Corporation, New York, N.Y., a corporation of New York Filed July 3, 1956, Ser. No. 595,739

5 Claims. (Cl. 340—174)

The present invention pertains generally to storage devices and relates more particularly to magnetic storage devices.

The invention is directed to a magnetic storage device employing one or more magnetic transducers and an associated recording medium having a suitable magnetizable surface with which the transducer cooperates in the conventional manner. Means are provided for driving the transducer relative to the recording medium for providing the necessary relative motion therebetween, and the driving means is arranged to define the path scanned by the transducer on the recording medium.

One object of the invention, therefore, is to provide an improved magnetic storage device.

Another object is to provide a magnetic storage device having means for driving a transducer relative to the recording medium wherein the path scanned by the transducer is defined by the driving means.

According to the invention, the driving means are arranged to reciprocate the transducer relative to the recording medium in each of two directions. In this way the transducer is caused to follow a path on the recording medium determined by the magnitude of the reciprocating forces. Assuming, for example, that the reciprocating forces are applied to the recording medium and that these forces consist of two forces acting in synchronism and at right angles to each other, the path of the transducer over the recording surface is in the form of a circle or ellipse, depending upon the relative magnitudes of the forces. In this way a given transducer is arranged to cooperate with selected portions of the recording medium under the control of the driving forces.

Thus, another object is to provide a magnetic storage device wherein relative motion between transducer and recording medium is provided by reciprocating one relative to the other.

A further object is to provide means for driving a recording medium relative to a transducer in each of two directions for causing the transducer to cooperate with portions of the medium defined by the driving forces.

Still another object is to provide a magnetic storage device having a transducer and recording medium with which it is arranged to cooperate wherein the transducer cooperates with selected portions of the medium under control of structure for moving the transducer relative to the medium, whereby the moving means provides the necessary relative motion between the transducer and the recording medium as well as defines the portion of the medium with which the transducer coacts.

Another object is to provide an improved storage device wherein access may be had at random to selected storage tracks under the control of the mechanism for moving the medium relative to the transducer.

A still further object is to provide a data storage device employing a plurality of magnetic transducers arranged to cooperate with a magnetic recording medium wherein access to selected data tracks is obtained by selection of a transducer and by the selection of the track with which the selected transducer cooperates.

Other objects of the invention will be pointed out in the following description and claims and illustrated in the accompanying drawings, which disclose, by way of example, the principle of the invention and the best mode which has been contemplated of applying that principle.

Figure 1:
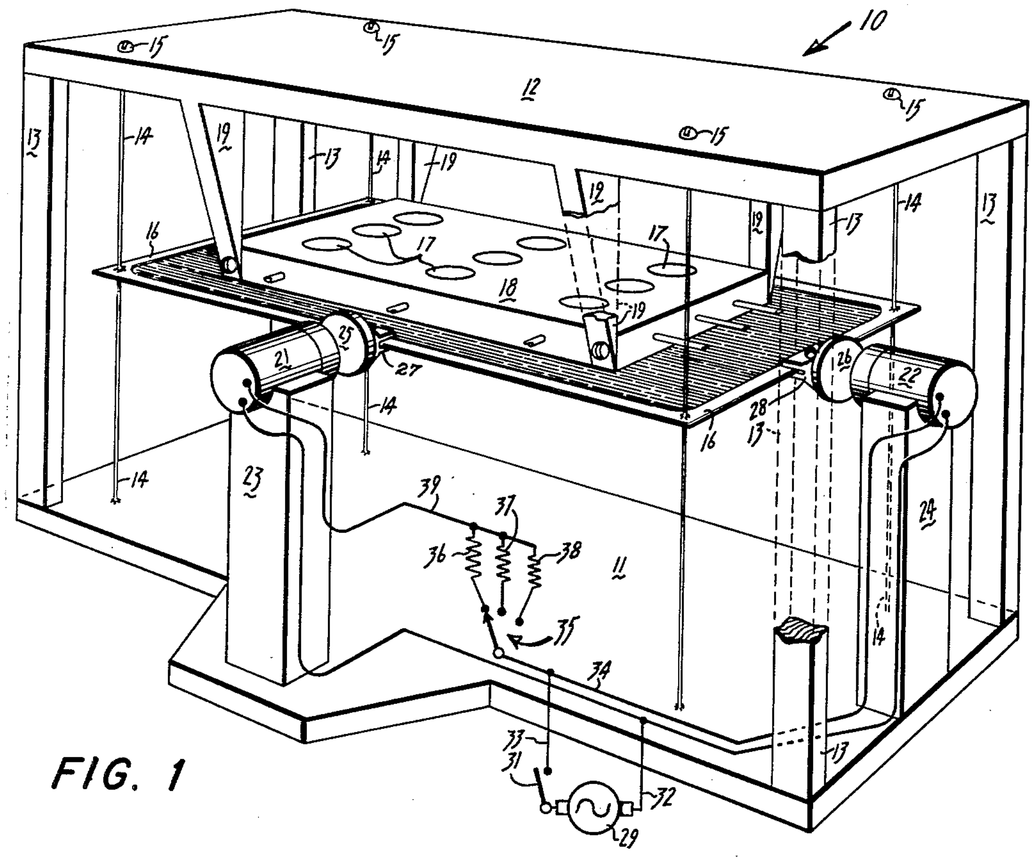
Fig. 1 is a perspective view of an embodiment of the invention.

Referring now to Fig. 1, the embodiment of the invention there shown generally comprises a supporting structure 10 having a base 11 and a top 12 spaced apart by columns 13. Four taut wires 14, such as piano wire or the like, are arranged to extend between the base 11 and top 12. each such wire being fixedly secured, as by welding, to the base and being adjustably secured to the top. The connection to the top may be made in any convenient manner to permit the tension in the wires to be adjusted as may be necessary. As shown in the drawing, each wire 14 is connected through a swivel (not shown) to a corresponding bolt 15 which is threadedly engaged with the top 12. Thus, the tension in the wires 14 is adjusted by adjusting the bolts 15.

Secured to and supported by the wires 14 is a sheet-like record member 16 provided with a magnetizable surface which serves as the recording medium. The record 16 is arranged to cooperate with a matrix of transducers 17 housed in a block 18 which is rigidly supported by four legs 19 formed integrally with the top 12 and secured to the block 18. The transducers 17 may be of any desired type suitable for the form of magnetic recording to be utilized, and it will be understood that any convenient switching structure may be utilized for selection of a desired transducer.

Relative motion between the transducers 17 and the record 16 to permit reading and recording of data in the usual manner is provided by displacing the record in the plane parallel to the surface thereof. For this purpose two solenoids 21 and 22 are provided, each solenoid being secured to and supported by corresponding support members 23 and 24, respectively, which are affixed to the base 11. The solenoids are arranged to cooperate with disc-shaped members 25 and 26, respectively, which are composed of soft magnetic material such as soft iron, and which are affixed to the record 16 by clamps 27 and 28, respectively, as shown in the drawing.

A power source 29 is arranged to energize the solenoids 21 and 22 when a switch 31 is closed. The source 29 may supply either A.-C. as indicated in the drawing or pulsating D.-C., whichever is preferred. One side of the source 29 is connected by a wire 32 to one side of each of the windings of the solenoids 21 and 22, the other side thereof being connected to a contact of the switch 31 by a wire 33. The armature of the switch 31 is connected by a wire 34 to the armature of a switch 35 as well as to the other side of the winding of the solenoid 22. Thus, when the switch 31 is closed, the full voltage developed by the source 29 is connected across the solenoid 22. The switch 35 is provided with three contacts in the present disclosure, each of which is connected through a resistor 36, 37 and 38, respectively, to a line 39 which, in turn, is connected to the other side of the winding of the solenoid 21. These resistors are provided to control the amplitude of the voltage across the solenoid 21 and, as will be explained, the condition of the switch 35 determines the track to be read from or to be recorded upon by selected transducers according to the voltage across the winding of the solenoid 21.

Figure 2:
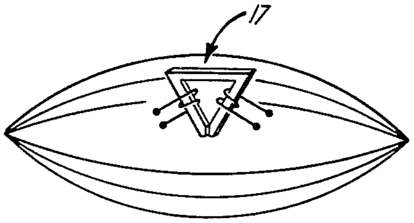
Fig. 2 is a diagrammatic illustration of the operation of the invention and depicts several paths of a transducer relative to the recording medium.

When the switch 31 is closed, the solenoids 21 and 22 are both energized, and since these solenoids are driven in synchronism, the record 16 is driven through an elliptical path. The path of the record relative to a particular transducer 17 is illustrated in Fig. 2, the particular path followed by a transducer relative to the record 16 being determined by the condition of the switch 35. This is true since the condition of the switch determines the voltage across the winding of the solenoid 21 and thereby determines the amount of displacement of the record toward the solenoid 21.

The amount of displacement brought about by the solenoid 22 is that which is convenient. For example, if it is desired to record 100 bits of information along each side of each elliptical track and if it is determined that the bit density is to be 100 bits per inch, then the voltage supplied to the solenoid 22 should be sufficient to cause at least a one-inch deflection of the record. The solenoid 21 is energized according to the spacing desired between adjacent data tracks. Thus, each transducer 17 is arranged to cooperate with an elliptical track provided on the record 16, the particular track being determined by the condition of the switch 35. Selection of a particular track, therefore, is accomplished by first selecting the transducer associated with the group of tracks containing the selected track and then by setting the position of the switch 35 to control movement of the record to cause that track to cooperate with the selected transducer.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A magnetic storage device comprising a flat magnetic recording surface, means for supporting said surface, said means being resilient for permitting planar motion thereof, a transducer for cooperating with said surface, said transducer being supported adjacent said surface, magnetic means for reciprocating said surface simultaneously in each of two directions parallel to the plane thereof, and means for controlling said magnetic means for controlling the relative magnitude of the reciprocating forces, the composite motion provided by said magnetic means and determined by said control means defining the portion of said surface cooperating with said transducer by presenting a predetermined elliptical path on said surface to said transducer according to said control means.

2. A magnetic storage device having a magnetic transducer arranged to cooperate with various magnetic recording tracks provided on a magnetic recording surface comprising first means for reciprocating said surface along a first axis in the plane of said surface, the distance moved along said first axis determining the track length, second means for reciprocating said surface along a second axis in the plane of said surface, the distance moved along said second axis determining the track with which the transducer cooperates, said second means operating while said first means operating such that the composite effect of said first and second driving means controls said surface to move along an elliptical path relative to said transducer, and means for controlling said second driving means for determining the degree of displacement along said second axis to thereby control said transducer to cooperate with a selected one of several elliptical paths on said surface according to said controlling means.

3. A magnetic storage device comprising a recording surface, means for supporting said surface, said means being resilient for permitting motion of said surface in the plane thereof along each of two axes, a transducer, means for supporting said transducer adjacent said surface for cooperating magnetically therewith, first means operable periodically for driving said surface in a first direction along a first of said axes, and second means for conjointly driving said surface in a second direction along a second of said axes, the resiliency of said support means causing a reversal of the direction of motion caused by said driving means between periods when said driving means is operable to cause the composite motion of said surface to reciprocate along an elliptical path thereon with which said transducer cooperates.

4. A magnetic storage device comprising a magnetic record sheet having a magnetizable surface, a magnetic transducer fixedly supported adjacent said surface for cooperating magnetically therewith, resilient means for yieldably supporting said sheet to permit planar displacement thereof conjointly along each of two axes, first means periodically operative for displacing said sheet a first predetermined distance along a first of said two axes, and second means periodically operative for displacing said sheet a second predetermined distance along a second of said two axes, the resiliency of said supporting means being adapted to reverse the motion of said sheet along each of said axes when said first and second displacing means are inoperative, and said first and second means operating in timed relation for periodically controlling said sheet to reciprocate along an elliptical path relative to said transducer for permitting magnetic cooperation between said transducer and an elliptical path on said surface defined by said first and second predetermined distances.

5. The invention set forth in claim 4 wherein said first and second displacing means each comprise an electromagnet for magnetically attracting said sheet and means for applying an alternating voltage across said electromagnet for periodically energizing said electromagnet to cause said sheet to reciprocate along said elliptical path.

References Cited in the file of this patent

UNITED STATES PATENTS

| | | |
|---|---|---|
| 2,650,830 | Potter | Sept. 1, 1953 |
| 2,681,387 | Roys | June 15, 1954 |
| 2,690,913 | Rabinow | Oct. 5, 1954 |
| 2,791,310 | Jones | May 7, 1957 |
| 2,837,046 | Carson et al. | June 3, 1958 |